Albert C. Richard's
Impd Screw-Wrench
REISSUED JUN 27 1871
4450
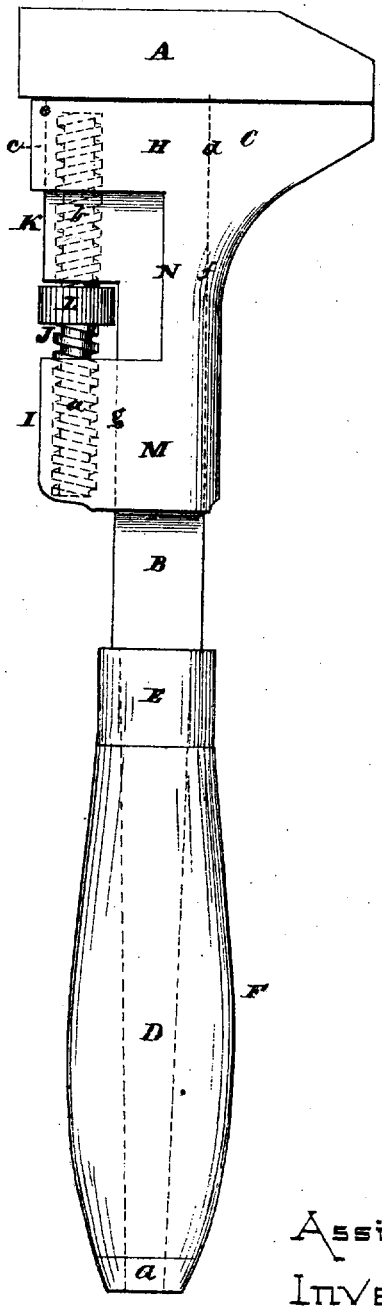
Witnesses
Thos. W. Dodge
A. E. Spencer
Assignee of the
Inventor
Avery G. Coes
AM. PHOTO-LITHOGRAPHIC CO. N.Y. (OSBORNE'S PROCESS.)

UNITED STATES PATENT OFFICE.

AURY G. COES, OF WORCESTER, MASSACHUSETTS, ASSIGNEE, BY MESNE ASSIGNMENTS, OF ALBERT C. RICHARD, DECEASED.

IMPROVEMENT IN WRENCHES.

Specification forming part of Letters Patent No. 27,090, dated February 7, 1860; reissue No. 4,450, dated June 27, 1871.

*To all whom it may concern:*

Be it known that ALBERT C. RICHARD, formerly of Newton, in the county of Fairfield and State of Connecticut, (since deceased,) did invent an Improved Wrench, of which the following is a full, clear, and exact description, reference being had to the accompanying drawing forming a part of this specification, and which drawing represents a side view of the said RICHARD'S improved wrench.

To enable those skilled in the art to which the invention belongs to make and use said improved wrench, I will proceed to describe its construction and operation.

In the drawing, the part marked A represents the stationary jaw upon the end of the smooth rectangular re-enforced bar B, upon which is fitted to work the sliding or movable jaw C, provided with two clasp-bearings or rectangular openings of different sizes to fit and work directly upon the varying-sized wrench-bar. The rear end of the bar B is hammered or otherwise worked down to form a shank, D, (see dotted lines,) for the reception of the ferrule E, handle F, and holding-nut G. The stationary jaw A, shank D, handle F, and holding-nut G may be made in any of the well-known modes of constructing similar parts of screw-wrenches; but the forward part of the bar B, over which the front part H of the movable jaw C works, is made broader than that portion over which the rear end of the movable jaw works; consequently the wrench is rendered very strong and less liable to bend and break in use when a given amount of metal is used in the bar, than it is when constructed in the ordinary manner—without any re-enforce to the bar. For the purpose of operating the jaw C, in this instance, the latter is provided with a projection, I, in which is fitted to work one end, *a*, of a screw, J, the other end, *b*, being fitted to work in the wide part K of the bar B, all as fully indicated in full and dotted lines in the drawing. To the middle of screw J is fastened a wheel or rosette, L, by means of which screw J can be turned to close or open the jaws. It will be noticed that the screw J is provided with a left-hand thread on one end and a right-hand thread on the other end, so that when it is turned the sliding jaw C will be moved back and forth upon the bar B very quickly.

In all wrenches of a similar nature having a stem or shank in a handle, and a head, A, on the end of the bar, the maximum strain or force applied in wrenching off or turning a tenacious object is centered in the point between *c* and *d*, where they bend and fail. By the combination with the stationary jaw and bar of an increased amount of metal, in the form of a re-enforce to that part, the wrench is rendered capable of withstanding a greater amount of strain without its being possible to bend or spring it, thus overcoming a great objection urged against the use of screw-wrenches.

The dotted lines *e*, *f*, and *g* indicate the shape of the smooth rectangular re-enforced wrench-bar for the reception of the sliding or movable jaw, which is provided with two clasp-bearings or rectangular openings, one at each end, of different sizes, to fit and work directly upon the different-sized parts of the wrench-bar, as before stated.

Having thus described the said ALBERT C. RICHARD'S improved wrench, what is claimed as his invention, and desired to have secured by Letters Patent, is—

1. A smooth rectangular re-enforced wrench-bar, the forward part of which, next to the stationary head, is made broader on the back edge than the rear smooth rectangular part, in the manner and form and for the purposes set forth and shown.

2. The combination, with a smooth rectangular re-enforced wrench-bar, the forward part of which, next to the stationary head or jaw, is made broader on one edge only than the rear smooth rectangular part, of a sliding jaw provided with two clasp-bearings or rectangular openings of different sizes to fit and work directly upon the varying-sized bar, substantially as stated.

3. The combination, with the forward part of the back of a wrench-bar, and the stationary head, of a re-enforce, substantially as set forth and described.

4. The combination, with the bar B, and jaw C, of the screw J, substantially as described.

AURY G. COES.

Witnesses:
THOS. H. DODGE,
A. E. PEIRCE.